(12) United States Patent
Ijima et al.

(10) Patent No.: US 8,115,752 B2
(45) Date of Patent: Feb. 14, 2012

(54) IMAGE DISPLAY DEVICE

(75) Inventors: Yukio Ijima, Kumamoto (JP); Takayuki Fukuda, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 1074 days.

(21) Appl. No.: 11/948,113

(22) Filed: Nov. 30, 2007

(65) Prior Publication Data

US 2008/0186289 A1 Aug. 7, 2008

(30) Foreign Application Priority Data

Feb. 6, 2007 (JP) ................................ 2007-026665

(51) Int. Cl.
*G06F 3/042* (2006.01)
*G09G 5/00* (2006.01)
(52) U.S. Cl. ..................... 345/175; 345/104; 345/207
(58) Field of Classification Search .................. 345/104, 345/207, 275, 175, 173, 94–100
See application file for complete search history.

(56) References Cited

U.S. PATENT DOCUMENTS

| | | | |
|---|---|---|---|
| 5,790,092 A | 8/1998 | Moriyama | |
| 6,342,876 B1 * | 1/2002 | Kim | ............................... 345/87 |
| 6,750,835 B2 * | 6/2004 | Azami | ............................. 345/89 |
| 7,403,185 B2 * | 7/2008 | Song et al. | .................... 345/100 |
| 2003/0156087 A1 | 8/2003 | Boer et al. | |
| 2006/0033016 A1 | 2/2006 | Ogawa et al. | |
| 2006/0262056 A1 | 11/2006 | Masutani et al. | |
| 2007/0080956 A1 * | 4/2007 | Fann | .............................. 345/207 |

FOREIGN PATENT DOCUMENTS

| | | |
|---|---|---|
| CN | 1866085 A | 11/2006 |
| JP | 58-66142 | 4/1983 |
| JP | 4-222018 | 8/1992 |
| JP | 5-281516 | 10/1993 |
| JP | 8-43795 | 2/1996 |
| JP | 2006-79589 | 3/2006 |
| JP | 2006-323642 | 11/2006 |

OTHER PUBLICATIONS

Office Action issued Oct. 19, 2011 in Chinese Patent Application No. 200810005801.1 filed Feb. 5, 2008 (with English translation).

* cited by examiner

*Primary Examiner* — Stephen Sherman
(74) *Attorney, Agent, or Firm* — Oblon, Spivak, McClelland, Maier & Neustadt, L.L.P.

(57) ABSTRACT

An image display device includes: a source wiring; a first gate wiring intersecting the source wiring to scan a first pixel electrode corresponding to a first scanning period; a second gate wiring adjacent to the first gate wiring to scan a second pixel electrode corresponding to a second scanning period consecutive to the first scanning period; a read signal line disposed in parallel to the source wiring; a light sensing element connected to the second gate wiring and the read signal line; and a light detection circuit configured to detect the presence or absence of light directed at the light sensing element upon receiving an output of the light sensing element. The first pixel electrode and the second pixel electrode are AC driven in the same polarity. The output of the light sensing element is connected to the light detection circuit for a predetermined interval during the second scanning period.

8 Claims, 10 Drawing Sheets

IMAGE DISPLAY DEVICE

CROSS-REFERENCE TO RELATED APPLICATIONS

This application is based upon and claims the benefit of priority from Japanese Patent Application No. 2007-026665, filed on Feb. 6, 2007, the entire contents of which are incorporated herein by reference.

BACKGROUND OF THE INVENTION

1. Field of the Invention

The present invention relates to an image display device, and more particularly to a liquid crystal display having a touch panel function with a built-in photo-sensor.

2. Description of the Related Art

JP-A-58-66142 (FIGS. 2 and 3) discloses a liquid crystal display with a built-in photo-sensor, especially a liquid crystal display capable of displaying the image and perform a reading operation from the photo-sensor at the same time. In this liquid crystal display, a photo-sensor (pixel sensor) is disposed at each pixel in a display matrix (hereinafter referred to as a "display part"), and a read signal line for photo-sensor is disposed separately from a source wiring for image display and connected with a detector configured to detect a threshold for detecting turning ON/OFF of the photo-sensor. Also, JP-A-4-222018 discloses a liquid crystal display with a built-in photo-sensor in which switching means switches between the image display and the coordinate detection in time division to make the image display and the coordinate detection by reading the photo-sensor consistent. Further, JP-A-2006-323642 discloses a display device having a selector part for reading the photo-sensor in time division is also well known.

However, in the pixel sensor circuit as described above, since a sensor is disposed corresponding to each of a plurality of signal lines, the number of signal lines is increased, and proportionally the number of sensors is also increased, as the display screen has larger size, higher definition and higher resolution, which makes the area larger and requires the higher cost.

As a method for solving the above-mentioned problem, a selector containing a thin film transistor (hereinafter referred to as "TFT") connected to the read signal line of the photo-sensor is disposed within the display device, the detector is connected via each selector to every plural read signal lines. Accordingly, the number of sensors is reduced by time division method, and the size of photo-sensor detection circuit itself is reduced, which suppresses the cost. If this method is adopted, there is an adverse influence on the potential at the detection timing before the end of detection period due to influence of coupling noise on the read signal line caused by polarity reversal of the source wiring potential after the gate wiring is turned ON, whereby it is difficult to detect the threshold for detecting turning ON/OFF of the photo-sensor, which may results in a deterioration of the precision of the coordinate detection is degraded.

SUMMARY OF THE INVENTION

This invention has been achieved in the light of the above-mentioned circumstances and has an object to provide an image display device that can make the coordinate detection by reading the photo-sensor at a desired precision.

According to a first aspect of the invention, there is provided an image display device including: a source wiring formed within a display screen; a first gate wiring that is formed within the display screen and intersects the source wiring to scan a first pixel electrode corresponding to a first scanning period; a second gate wiring that is formed adjacent to the first gate wiring to scan a second pixel electrode corresponding to a second scanning period consecutive to the first scanning period; a read signal line disposed in parallel to the source wiring; a light sensing element connected to the second gate wiring and the read signal line; and a light detection circuit configured to detect the presence or absence of light directed at the light sensing element upon receiving an output of the light sensing element, wherein the first pixel electrode and the second pixel electrode are AC driven in the same polarity, and wherein the output of the light sensing element is connected via the read signal line to the light detection circuit for a predetermined interval during the second scanning period.

According to a second aspect of the invention, there is provided an image display device including: a source wiring formed within a display screen; a first gate wiring that is formed within the display screen and intersects the source wiring to scan a first pixel electrode corresponding to a first scanning period; a second gate wiring that is formed adjacent to the first gate wiring to scan a second pixel electrode corresponding to a second scanning period consecutive to the first scanning period; a read signal line disposed in parallel to the source wiring; a first switching element that connects an output of a first light sensing element to the read signal line based on a scanning signal of the first gate wiring; a second switching element that connects an output of a second light sensing element to the read signal line based on a scanning signal of the second gate wiring; a light detection circuit configured to detect the presence or absence of light directed at the light sensing element upon receiving an output of the first or second light sensing element connected to the read signal line; and a light detection signal processing circuit that is connected with the light detection circuit to detect an input coordinate based on the output of the light detection circuit; wherein, when the first pixel electrode and the second pixel electrode are AC driven in the same polarity, the output of the first light sensing element is not used for detecting the input coordinate in the light detection signal processing circuit.

DETAILED DESCRIPTION OF THE PREFERRED EMBODIMENTS

Embodiment 1

Figure 1:
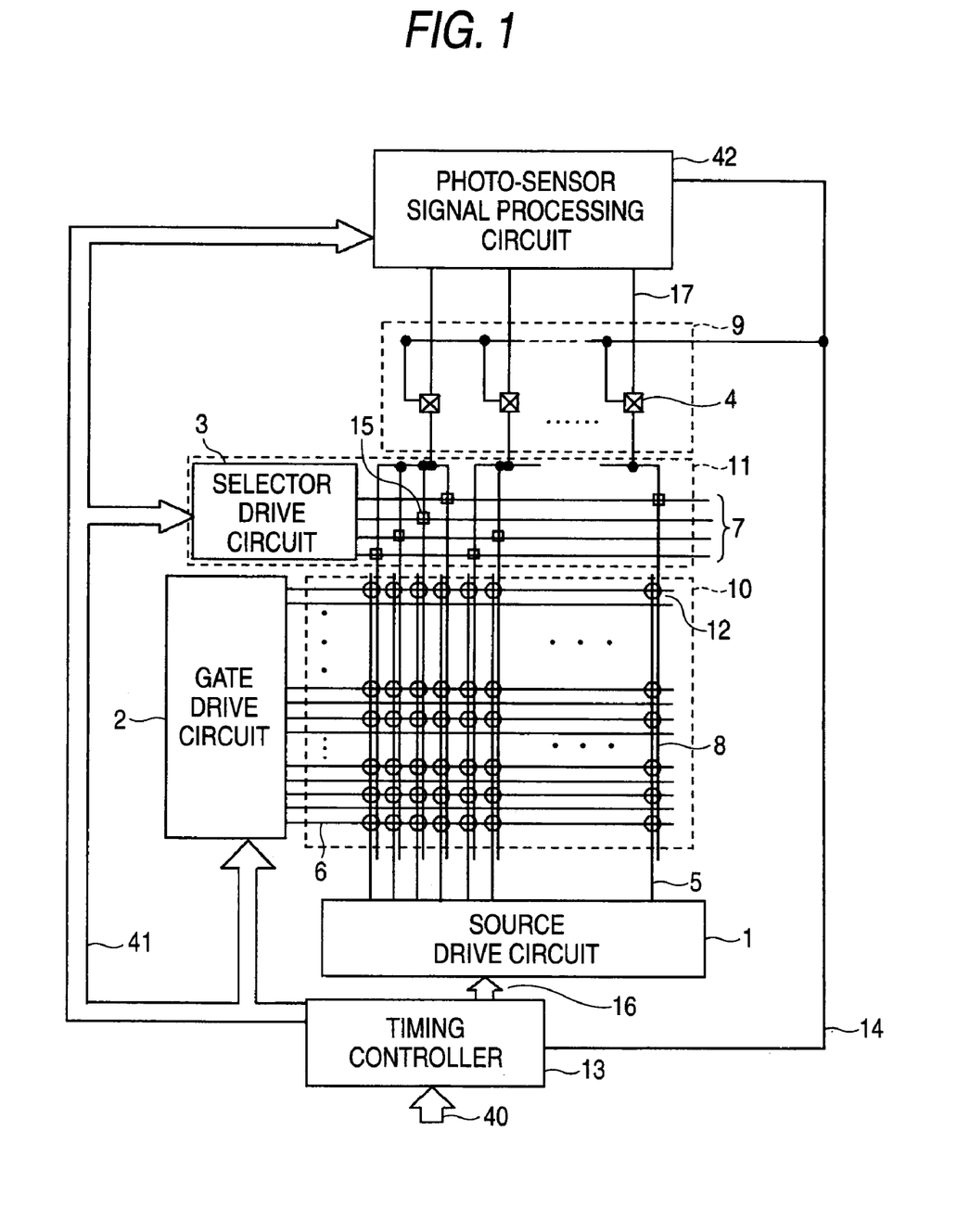
FIG. 1 is a schematic view of an image display device according to embodiments 1 to 5.
Figure 2:
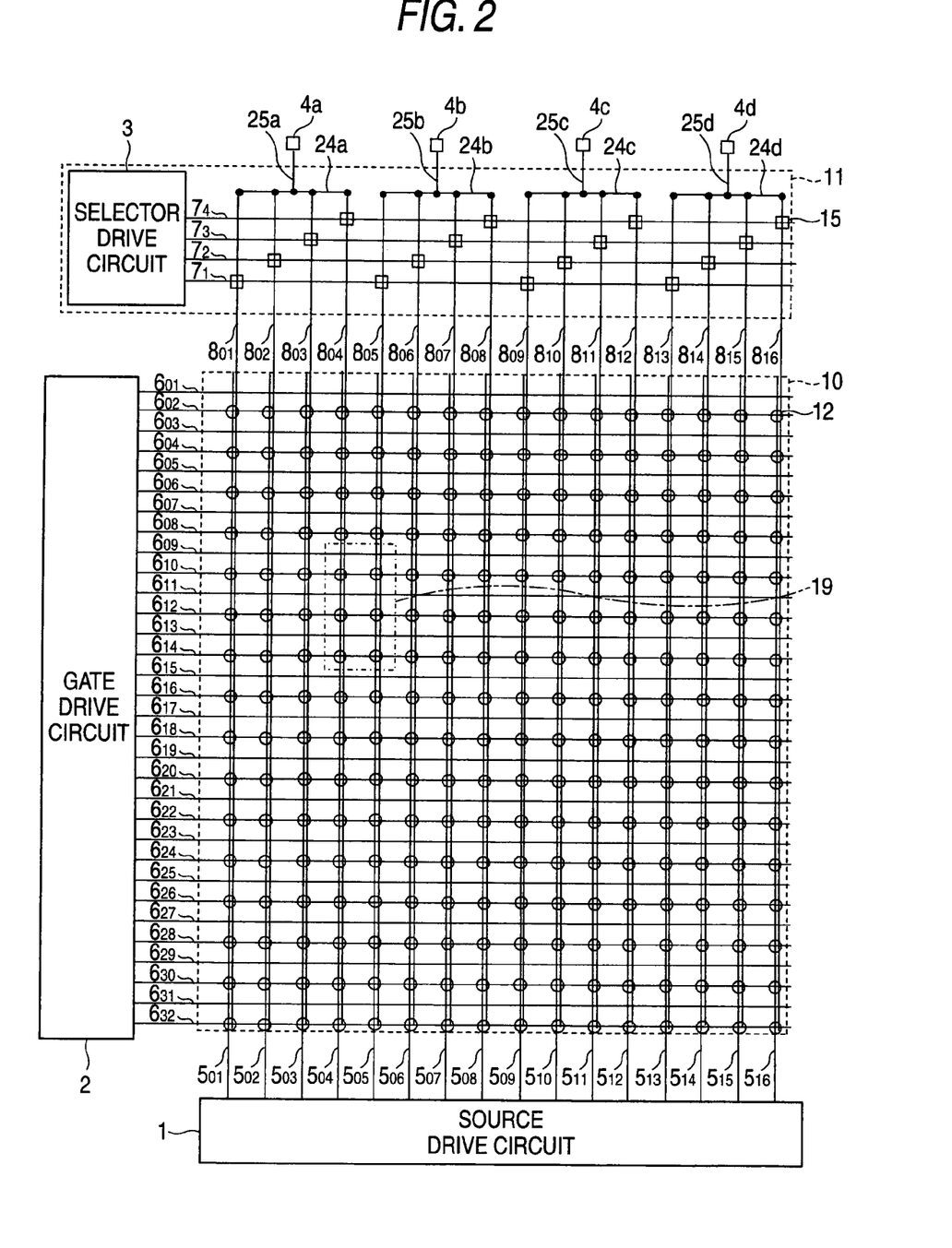
FIG. 2 is a detailed typical view of a display matrix and a selector part of a photo-sensor read signal line according to an embodiment 1 of the invention.
Figure 3:
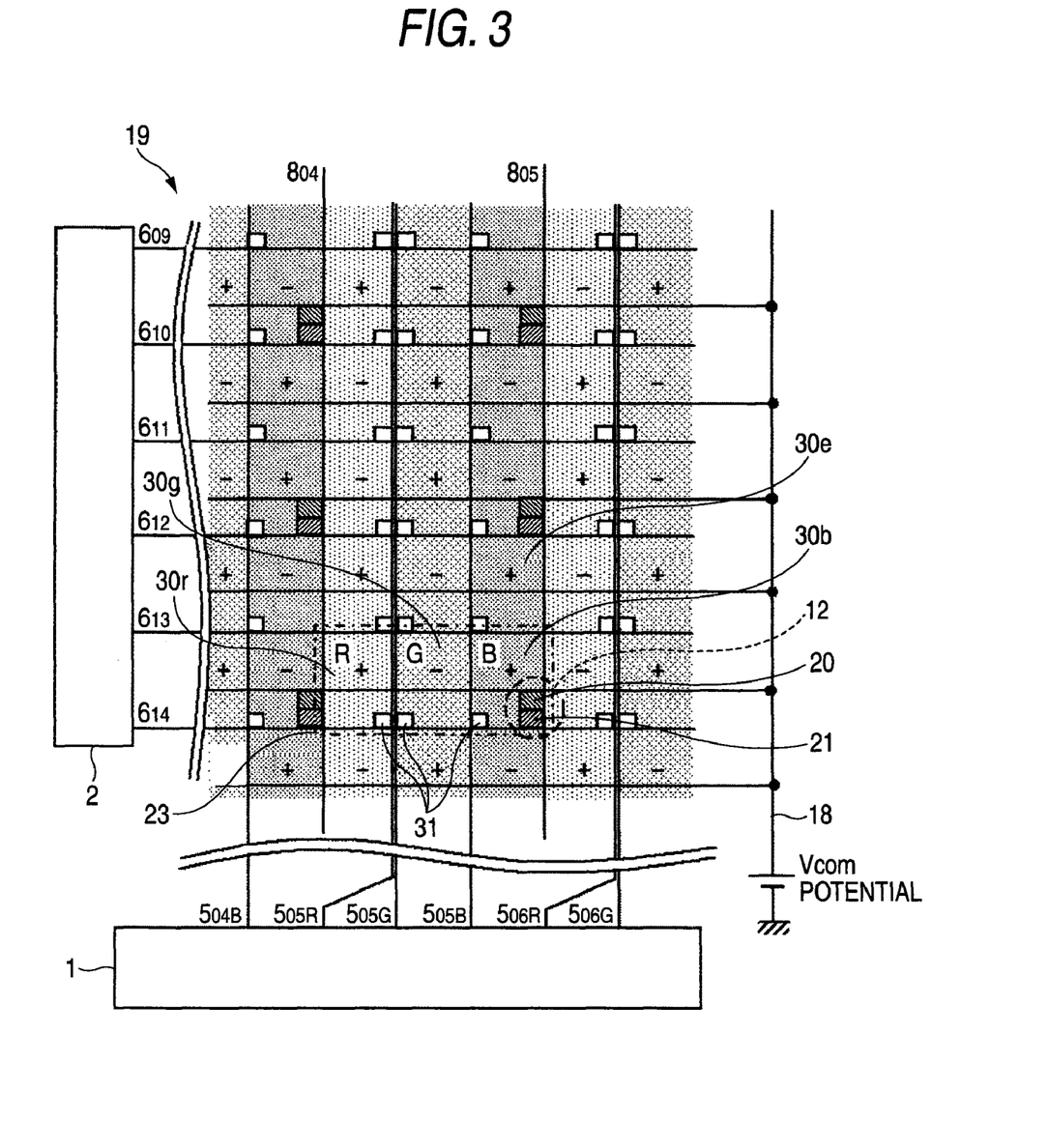
FIG. 3 is a detailed configuration view of a matrix display circuit in a part of the display matrix shown in FIG. 2.
Figure 4:
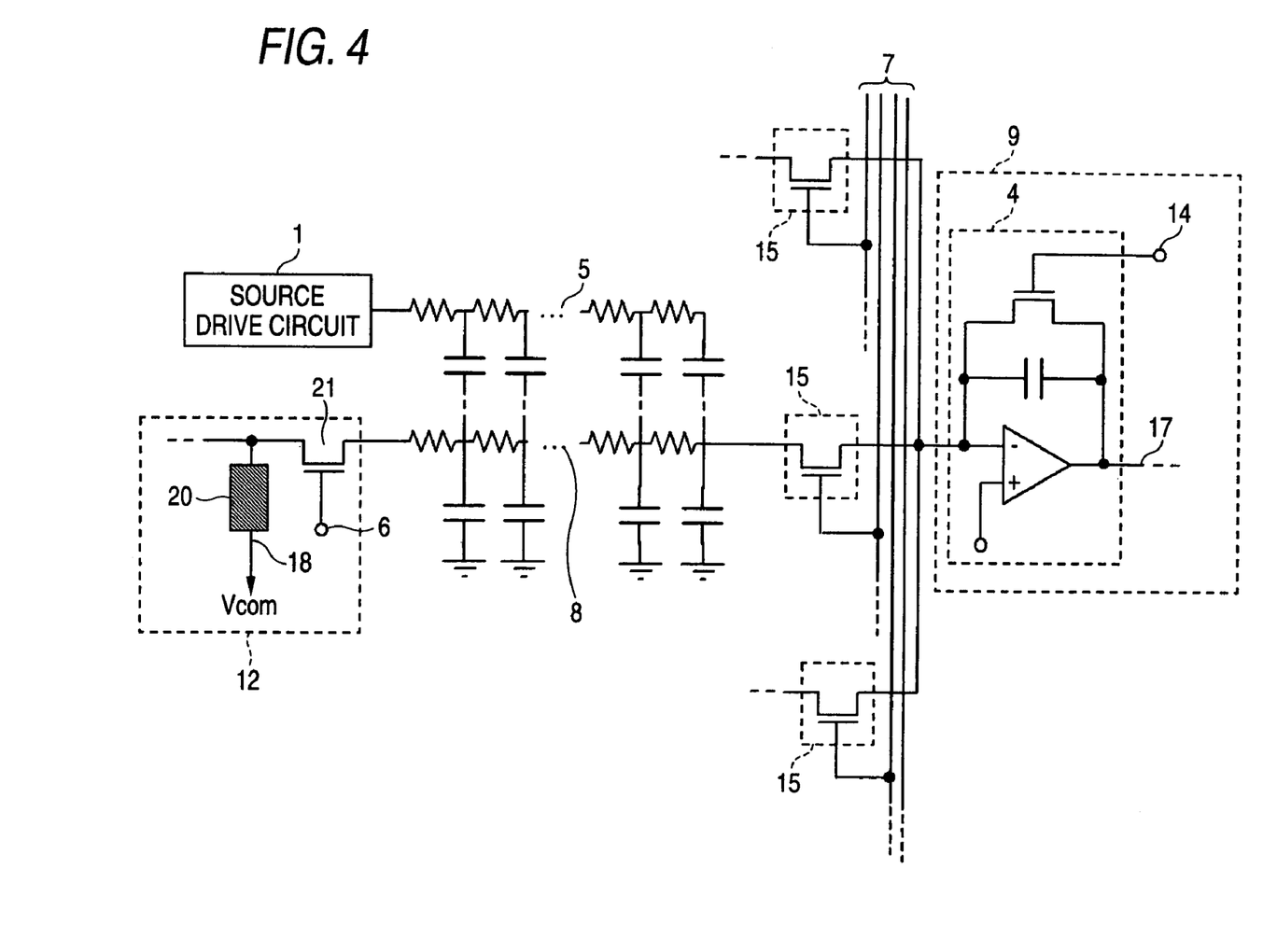
FIG. 4 is a detailed view from a photo-sensor to a photo-sensor detection circuit shown in FIG. 1.
Figure 5:
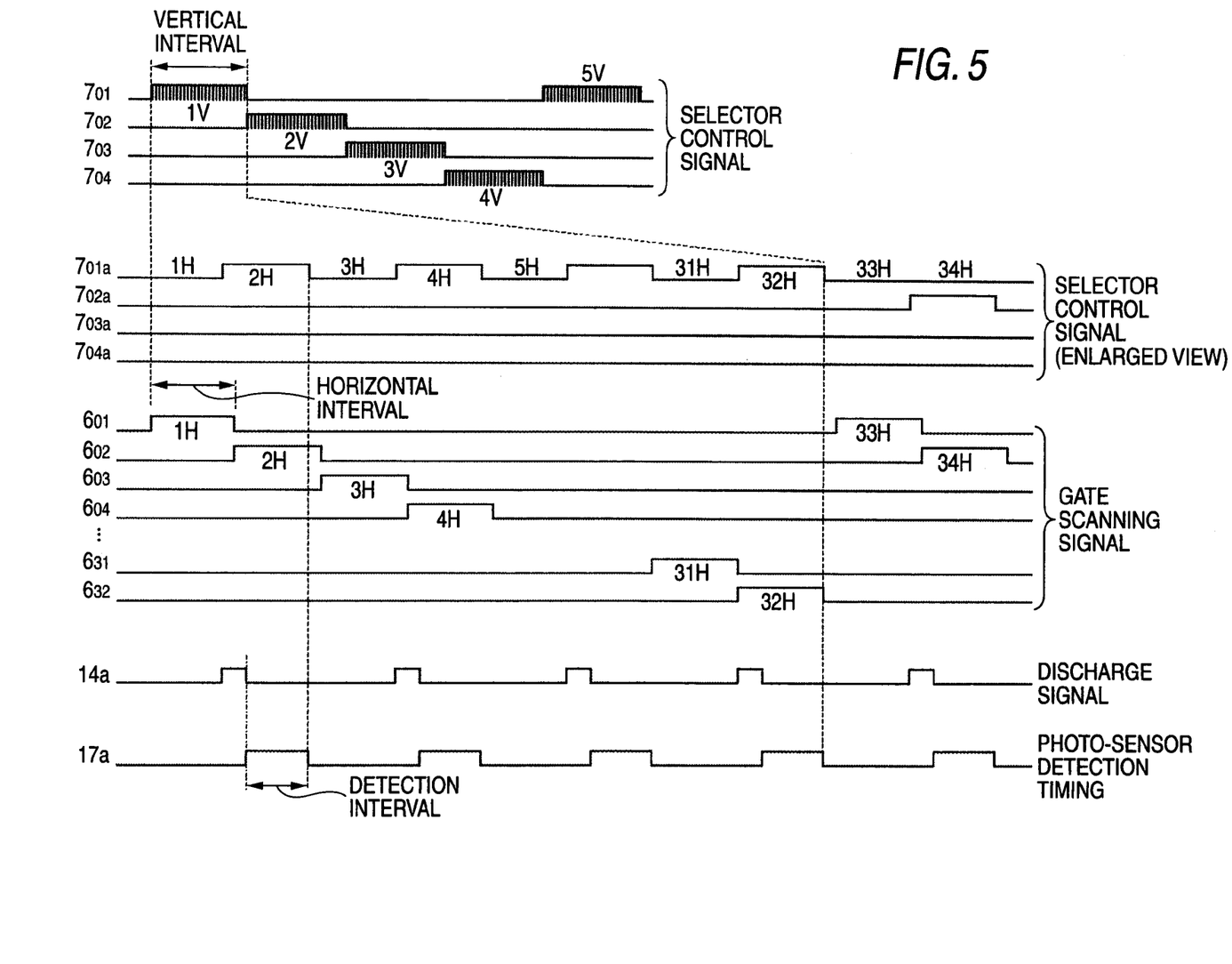
FIG. 5 is a timing chart for explaining a drive method for the image display device according to the embodiment 1 of the invention.
Figure 6:
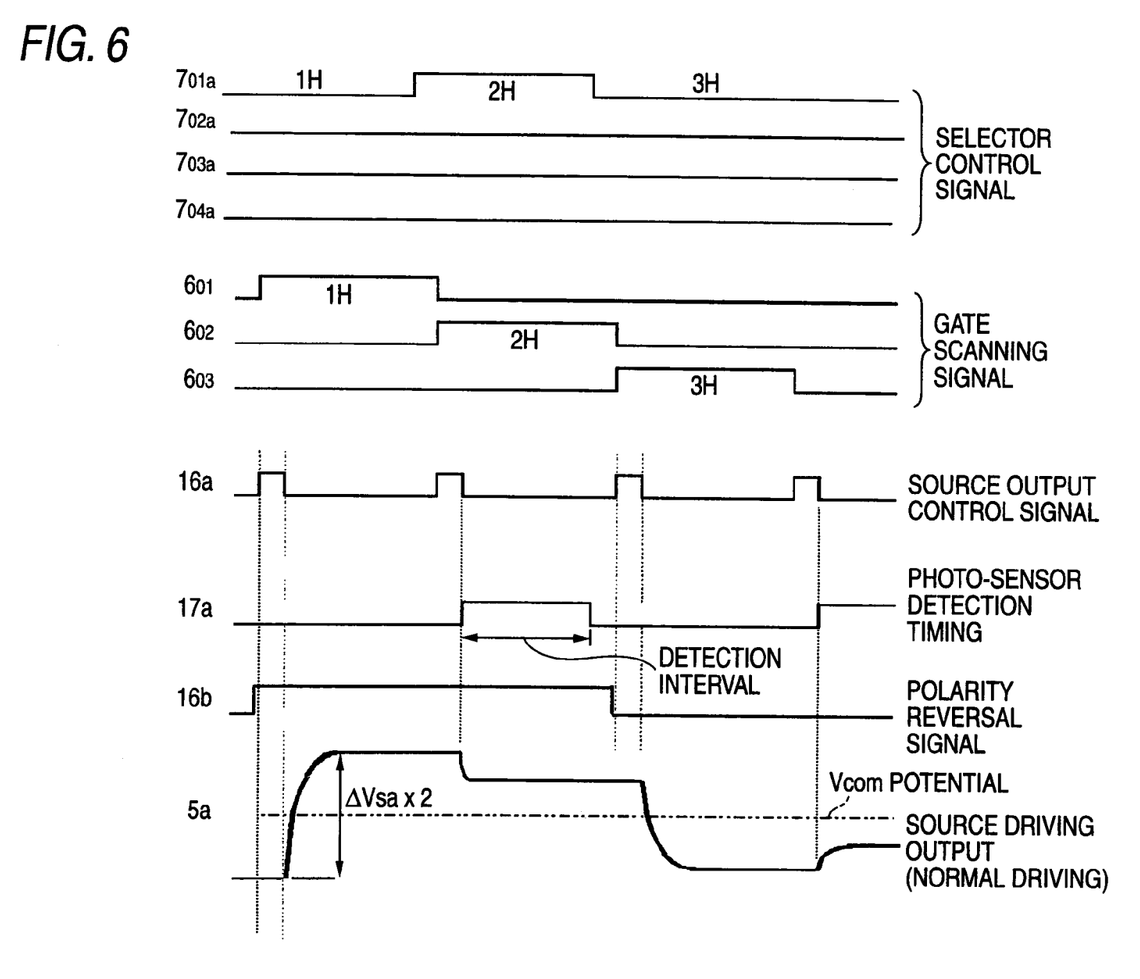
FIG. 6 is a timing chart showing the drive method for the display device according to the embodiment 1 of this invention and one example of detailed waveform for the source wiring disposed in the display matrix.

An embodiment 1 of the present invention will be described below with reference to FIGS. 1 to 6. FIG. 1 is a view showing typically the configuration of a liquid crystal display having a touch panel function with built-in photosensors according to an embodiment 1 of the invention. FIG. 2 is a detailed typical view of a display part 10 and a selector circuit 11 of a photo-sensor read signal line shown in FIG. 1. Also, FIG. 3 is a detailed configuration view of a matrix display circuit 19 in a part of the display part 10 shown in FIG. 2. Further, FIG. 4 is a detailed view showing the configuration from a photo-sensor (light sensing element) to a photo-sensor detection circuit (light detection circuit) shown in FIG. 1. FIG. 5 is a timing chart for explaining a drive method for the display device according to the embodiment 1 of the invention. Also, FIG. 6 is a timing chart showing a drive method for the display device according to the embodiment 1 and one example of detailed waveform of a source wiring 5 disposed in the display part 10.

FIG. 1 shows the schematic configuration of a liquid crystal display containing a photo-sensor having a selector circuit 11. A display part 10 of the liquid crystal display with a pixel sensor circuit 12 is formed on an insulating substrate (not shown), and the liquid crystal display includes a plurality of gate wirings 6 outputted from a gate drive circuit 2, a plurality of source wirings 5 outputted from a source drive circuit 1, and a display pixel electrode and a pixel drive TFT (not shown here) for driving the display pixel electrode at the intersection between the gate wiring 6 and the source wiring 5.

Further, a plurality of read signal lines 8 are connected to a pixel sensor circuit 12 placed at a predetermined position within the display part 10 and pulled out of a display area of the display part 10.

The selector circuit 11 placed in an area outside the display area 10 includes: the plurality of read signal lines 8 and a plurality of selector control lines 7 arranged in a matrix to intersect via an insulation layer; a selector TFT 15 placed at the intersection for selecting the read signal line 8 to be connected to an integrator 4; and a selector drive circuit 3 for driving the selector control lines 7.

The selector TFT 15 is turned ON/OFF by the plurality of selector control lines 7 driven by the selector drive circuit 3, so that the read signal line 8 connected to the integrator 4 is switched by time division. With this configuration, the number of circuits of the integrators 4 within a photo-sensor detection circuit 9 can be reduced.

A timing controller 13 inputs a video signal 40 from an external apparatus, not shown, and outputs a gate drive circuit control signal 41 to the gate drive circuit 2 and a source drive circuit control signal 16 to the source drive circuit 1 to control both the drive circuits. Also, the timing controller 13 outputs a discharge signal 14 for initializing the photo-sensor detection circuit 9 to the photo-sensor detection circuit 9. A photo-sensor signal processing circuit 42 (light detection signal processing circuit) receives the gate drive circuit control signal 41 and the discharge signal 14 from the timing controller 13 and performs the signal processing for a photo-sensor detection output 17.

FIG. 2 is a detailed typical view of the display part 10 and the selector circuit 11 for selecting the photo-sensor read signal line shown in FIG. 1. In FIG. 2, a plurality of source wirings $5_{01}$ to $5_{16}$ extending in the row direction are formed within the display part 10. The source wirings $5_{01}$ to $5_{16}$ are connected to the source drive circuit 1. Also, a plurality of gate wirings $6_{01}$ to $6_{32}$ extending in the row direction are formed within the display screen 10. The gate wirings $6_{01}$ to $6_{32}$ are connected to the gate drive circuit 2. The gate drive circuit 2 drives sequentially the gate wirings $6_{01}$ to $6_{32}$ in one horizontal period (hereinafter referred to as 1H). In the following explanation, the gate wirings are driven in the order of $6_{01}$, $6_{02}$, $6_{03}$, .... An image for one frame is displayed by driving the gate wirings $6_{01}$ to $6_{32}$.

A pixel having a pixel drive TFT, not shown, is disposed at each intersection between the source wiring $5_{01}$ to $5_{16}$ and the gate wiring $6_{01}$ to $6_{32}$. A gate electrode of this pixel drive TFT is connected to the gate wiring $6_{01}$ to $6_{32}$, and a source electrode is connected to the source wiring $5_{01}$ to $5_{16}$. Each pixel includes three sub pixels, not shown, which are responsible for display of the colors of R (red), G (green) and B (blue), arranged like stripe, as will be described later. A pixel sensor circuit 12 employing a photo-sensor of any type such as a photo transistor is formed within the B sub pixel (second pixel electrode) connected to the even-numbered gate wiring as indicated by reference numeral $6_{02}$, $6_{04}$, $6_{06}$, ..., $6_{32}$, in other words, the gate wiring (second gate wiring) for scanning the pixels in the even-numbered row within the display part 10. On the other hand, no pixel sensor circuit is formed within the sub pixel (first pixel electrode) connected to the odd-numbered gate wiring as indicated by reference numeral $6_{01}$, $6_{03}$, $6_{05}$, ..., $6_{31}$, in other words, the gate wiring (first gate wiring) for scanning the pixels in the odd-numbered row within the display part 10.

Needless to say, it is unnecessary that a pixel drive TFT (third switching element) connected to the gate wiring for scanning the pixels in the odd-numbered row and a pixel drive TFT (fourth switching element) connected to the gate wiring for scanning the pixels in the even-numbered row differ in the function of driving the pixels and the driving capability.

For the simplification of the drawings, the number of source wirings is 16 and the number of gate wirings is 32 in FIG. 2, but the invention is not limited to these numbers. In practice, more source wirings and more gate wirings are formed. The other embodiments 2 to 5 as will be described later are similarly treated.

A plurality of read signal lines $8_{01}$ to $8_{16}$ extending along the column direction are formed corresponding to the source wirings $5_{01}$ to $5_{16}$. Each read signal line $8_{01}$ to $8_{16}$ is connected to a plurality of (16 in the example of FIG. 1) pixel sensor circuits 12 belonging to the same column in every other row. The read signal lines $8_{01}$ to $8_{04}$ are connected to a signal line 24a, which is connected via a signal line 25a to an integrator 4a. That is, four read signal lines $8_{01}$ to $8_{04}$ are unified by the signal line 24a, and connected to one integrator 4a. A signal detected by the pixel sensor circuits 12 connected to the read signal lines $8_{01}$ to $8_{04}$ is read via the read signal line $8_{01}$ to $8_{04}$, and the signal lines 24a and 25a by the integrator 4a. Likewise, the read signal lines $8_{05}$ to $8_{08}$, $8_{09}$ to $8_{12}$ and $8_{13}$ to $8_{16}$ are connected to the signal lines 24b, 24c and 24d, respectively. The signal lines 24b, 24c and 24d are connected via the signal lines 25b, 25c and 25d to the integrators 4b, 4c and 4d, respectively.

A plurality of selector control lines $7_1$ to $7_4$ are formed orthogonal to the read signal lines $8_{01}$ to $8_{16}$. The selector control lines $7_1$ to $7_4$ are connected to the selector drive circuit 3. A selector TFT 15 is formed at each of the intersecting points between the selector control line $7_1$ and the read signal lines $8_{01}$, $8_{05}$, $8_{09}$, $8_{13}$, the intersecting points between the selector control line $7_2$ and the read signal lines $8_{02}$, $8_{06}$, $8_{10}$, $8_{14}$, the intersecting points between the selector control line $7_3$ and the read signal lines $8_{03}$, $8_{07}$, $8_{11}$, $8_{15}$, and the intersecting points between the selector control line $7_4$ and the read signal lines $8_{04}$, $8_{08}$, $8_{12}$, $8_{16}$. For example, the selector TFT 15 formed at the intersecting point between the selector control line $7_1$ and the read signal line $8_{01}$ includes: a gate electrode connected to the selector control line $7_1$; and a source electrode and a drain electrode connected to the read signal line $8_{01}$, in which if the selector control line $7_1$ is driven by the selector drive circuit 3, the selector TFT 15 is turned ON so that the read signal line $8_{01}$ conducts.

Since four selector TFTs 15 are connected to the selector control line $7_1$, the read signal lines $8_{01}$, $8_{05}$, $8_{09}$ and $8_{13}$ conduct simultaneously by driving the selector control line $7_1$. The other selector control lines $7_2$ to $7_4$ are analogous, in which the read signal lines $8_{02}$, $8_{06}$, $8_{10}$ and $8_{14}$ conduct by driving the selector control line $7_2$, the read signal lines $8_{03}$, $8_{07}$, $8_{11}$ and $8_{15}$ conduct by driving the selector control line $7_3$, and the read signal lines $8_{04}$, $8_{08}$, $8_{12}$ and $8_{16}$ conduct by driving the selector control line $7_4$.

The selector TFT 15 disposed at the intersecting point between the selector control lines $7_1$ to $7_4$ and the read signal lines $8_{01}$ to $8_{16}$ outside the display part 10 can be formed through the same process as the pixel drive TFT (not shown) disposed at the intersecting point between the source wirings $5_{01}$ to $5_{16}$ and the gate wirings $6_{01}$ to $6_{32}$ within the display part 10. That is, by changing the mask pattern, when the pixel drive TFT is formed within the display screen in an array manufacturing process, the selector TFT 15 can be fabricated outside the display screen together. Thereby, the manufacturing cost can be lower than the case where the selector TFT 15 is formed in a different process from the process of forming the pixel drive TFT within the display screen. The other embodiments 2 to 5 are analogous.

FIG. 3 is a detailed configuration view of a matrix display circuit 19 in a part of the display part 10 shown in FIG. 2. In a typical color liquid crystal display of this embodiment, each pixel includes three sub pixels corresponding to the display of three colors of R (red), G (green) and B (blue), arranged like stripe, as previously described. The driving of the display electrode for each sub pixel is not described in detail.

Exemplifying one pixel 23 in FIG. 3, the configuration of the pixel sensor circuit 12 within the pixel will be described below in detail. The pixel 23 includes a sub pixel 30r displaying red color, a sub pixel 30g displaying green color and a sub pixel 30b displaying blue color, in which a pixel driving TFT 31 is disposed at the lower left corner or lower right corner of each sub pixel. The source electrode of each pixel drive TFT 31 is connected to the source wirings $5_{05R}$, $5_{05G}$, $5_{05B}$, and the gate electrode is connected to a common gate wiring $6_{14}$. A common electrode wiring 18 for feeding an auxiliary capacity electrode, not shown, extends in the row direction through the central part of each sub pixel, and is supplied with a Vcom potential that is potential of a counter electrode, not shown.

Herein, the pixel sensor circuit 12 is disposed one at each pixel in the even-numbered row, as previously described. For example, at one pixel 23, it is disposed at the lower right corner (particularly an area surrounded by the gate wiring $6_{14}$ and the common electrode wiring 18) of B sub pixel 30b, and includes a photo-sensor 20 and a photo-sensor drive TFT 21. The photo-sensor 20 has one end connected to the source electrode of the photo-sensor drive TFT 21, and the other end connected to the common electrode wiring 18. The photo-sensor drive TFT 21 further has the drain electrode connected to the signal line $8_{05}$, and the gate electrode connected to the gate wiring $6_{14}$.

Further, in this embodiment, as an AC drive method for liquid crystal driving, a dot reversal AC driving of two rows× one column pattern in which the polarity in the top row of the display part 10 and the polarity in the second row are the same is performed, as indicated by the sign + and − within each sub pixel in FIG. 3.

For example, a sub pixel 30e driven by the gate wiring $6_{13}$ is driven in positive polarity (indicated by + sign) in the thirteenth horizontal period after the end of vertical blanking, and a sub pixel 30b driven by the gate wiring $6_{14}$ is driven in positive polarity in the fourteenth horizontal period after the end of vertical blanking. Also, the sub pixels right and left adjacent to the sub pixels 30e and 30b are driven in negative polarity (indicated by − sign) in the same horizontal period.

That is, the sub pixels adjacent in every column (transverse direction=horizontal scanning direction) have a drive pattern different in + and −, and the sub pixels adjacent in every row (longitudinal direction) have a drive pattern alternating in + and − in every two rows. Accordingly, when a pair of longitudinally two sub pixels within the display part 10 is considered, the sub pixel (first pixel electrode) located in the odd-numbered row is driven in the odd-numbered horizontal period (first scanning period) after the end of vertical blanking, and always driven in the same polarity as the sub pixel (second pixel electrode) located in the even-numbered row which is subsequently driven in the even-numbered horizontal period (second scanning period). Also, the upper pixel is located in the odd-numbered row, and the lower pixel is located in the even-numbered row. When the pixel sensor circuit 12 is disposed in every other row as shown in FIG. 3 and the pixel sensor circuit 12 is disposed at the sub pixel in the even-numbered row as described above, the sub pixel with the pixel sensor circuit 12 disposed is always driven in the same polarity as the upper sub pixel by one row. Also, since the photo-sensor drive TFT 21 of the pixel sensor circuit 12 has the gate electrode connected to the gate wiring for driving the pixels in the even-numbered row as described above, the output of the pixel sensor circuit 12 is applied to the read signal line 8, corresponding to the even-numbered horizontal period after the end of vertical blanking, and inputted via the selector circuit 11 into the photo-sensor detection circuit 9.

Generally, the polarity of positive or negative in each sub pixel of two rows×one column pattern is reversed for every frame, as well known. It is analogous in this embodiment, and not described in detail here.

Though the source wirings $5_{05R}$ and $5_{06R}$ for driving the sub pixel of R are wired on the right hand of the corresponding sub pixel in FIG. 3, this is aimed to reduce the coupling noise from the source wirings $5_{05R}$ and $5_{06R}$ to the read signal lines $8_{04}$ and $8_{05}$ by taking the longest distance from the read signal lines $8_{04}$ and $8_{05}$ as possible. Further, the arrangement of the source wiring corresponding to this R sub pixel on the right side of pixel is applied to the entire display part 10 as shown in FIG. 2.

FIG. 4 is a detailed view from the photo-sensor 20 to the photo-sensor detection circuit 9. A discharge signal 14 for resetting the integrator is inputted from the timing controller 13 (see FIG. 1) into the integrator 4 in the photo-sensor detection circuit 9. Reference numeral 21 denotes a photo-sensor drive TFT at the output stage in the pixel sensor circuit 12. The presence or absence of light directed at the photo-sensor 20 is detected as the output value of the pixel sensor circuit 12 via the read signal line 8 in the photo-sensor detection circuit 9 to obtain the positional information of input. Also, a comparator, not shown, is provided at the latter stage of the integrator 4. The turning ON/OFF of the photo-sensor is identified by comparing the output potential of the integrator in directing light at the photo-sensor or shielding light from the photo-sensor with a certain threshold.

More particularly, the photo-sensor 20 has one end connected to the source electrode of the photo-sensor drive TFT 21, and the other end connected through the common electrode wiring 18 to the Vcom potential. The photo-sensor drive TFT 21 has the gate electrode connected to the corresponding gate wiring 6, and is turned ON/OFF in synchronization with the horizontal scanning timing of the pixel where the pixel sensor circuit 12 is placed to control the conduction between the output terminal of the photo-sensor 20 and the read signal line 8. Since this read signal line 8 is connected to the input of the integrator 4 during the ON interval of the selector TFT 15 controlled by the selector control line 7, the output of the photo-sensor 20 is integrated by the integrator 4 for the interval where the photo-sensor drive TFT 21 and the selector TFT 15 are turned ON at the same time, to obtain a photo-sensor detection output 17.

Also, the integrator 4 is initialized (by discharging the capacitor contained within the circuit) at every predetermined interval upon the discharge signal 14.

The photo-sensor detection output 17 is subjected to the signal processing in the photo-sensor signal processing circuit 42 shown in FIG. 1, whereby the coordinate is detected by reading the photo-sensor. Herein, the signal processing involves deducing the scanning timing of each photo-sensor by referring to the gate drive circuit control circuit 41 and the discharge signal 14 outputted from the timing controller 13 and detecting the position of input coordinate of the pixel sensor circuit 12.

As will be clear from FIGS. 1 to 3, the read signal line 8 and the source wiring 5 are arranged in parallel across each sub pixel electrode within the display part 10, and a coupling capacitance as shown in FIG. 4 exists between the read signal line 8 and the source wiring 5. Further, a stray capacitance exists between the read signal line 8 and the counter electrode, so that the pixel drive signal of the source wiring 5 is superposed on the read signal line 8 as the noise component (coupling noise) depending on the coupling capacitance and the stray capacitance. This amount of noise component is further changed by the output resistance value of the photo-sensor 20, the ON resistance value of the photo-sensor drive TFT 21 and the wiring resistance value of the read signal line 8. Of course, the lower each resistance value, the smaller the noise component. However, each resistance value is restricted in the design and manufacture term, in which even if the source wiring 5 corresponding to the sub pixel of R is wired on the right side of R sub pixel in the structure as previously described, the pixel drive signal noise is superposed on the read signal line 8 to some degree.

FIG. 5 shows a timing chart for explaining a drive method for the display device according to the embodiment 1 of the invention. In FIG. 5, the selector control signals outputted from the selector drive circuit 3 to the selector control lines $7_1$ to $7_4$ are denoted by reference numerals $7_{01}$ to $7_{04}$. Also, signs $7_{01a}$ to $7_{04a}$ denote the waveforms in which the reference numerals $7_{01}$ to $7_{04}$ are enlarged in the time axis direction. In FIG. 5, reference numerals $6_{01}$ to $6_{32}$ are gate scanning signals applied to the gate wirings $6_{01}$ to $6_{32}$ as shown in FIGS. 1 to 3. The horizontal scanning for the display part 10 is performed by applying the "H" pulse in the order from the gate wiring $6_{01}$ at the top row to $6_{32}$ at every 1H.

The selector control signal as indicated by reference numerals $7_{01}$ to $7_{04}$ of FIG. 5 is a train of 16 pulses having an interval length of 1H that become "H" at every other 1H in one vertical period (hereinafter referred to as 1V), in which the time length of one train is 32H. More particularly, the "H" pulse is applied to the selector control line $7_1$ corresponding to the even-numbered horizontal interval in the order from 2nd 1H interval, 4th 1H interval, . . . and 32nd 1H interval, as will be clear from the waveforms of signs $7_{01a}$ to $7_{04a}$ in FIG. 5.

Accordingly, since the "H" pulse is applied in the order from the gate wiring $6_{01}$ to $6_{32}$ at every 1H, as will be clear from the waveforms of reference numerals $6_{01}$ to $6_{32}$ of FIG. 5, a total of 254 photo-sensors 20 disposed in the even-numbered rows of the display part 10 are sequentially scanned from top to bottom in the order from the gate wirings $6_{02}, 6_{04}, 6_{06}, \ldots 6_{32}$ during the first 1V, in which only the outputs of the photo-sensors 20 (a total of 64) connected to the read signal lines $8_{01}, 8_{05}, 8_{09}, 8_{13}$ are read via the photo-sensor drive TFT 21 into the integrator 4.

Likewise, as will be clear from the waveform of reference numeral $7_{02}$ of FIG. 5, the outputs of the photo-sensors 20 connected to the read signal lines $8_{02}, 8_{06}, 8_{10}, 8_{14}$ are read into the integrator 4 during the second 1V. During the third 1V, the outputs of the photo-sensors 20 connected to the read signal lines $8_{03}, 8_{07}, 8_{11}, 8_{15}$ are read into the integrator 4. During the fourth 1V, the outputs of the photo-sensors 20 connected to the read signal lines $8_{04}, 8_{08}, 8_{12}, 8_{16}$ are read into the integrator 4. If the fourth 1V is ended, the outputs of all the photo-sensors 20 within the display part 10 are read, whereby the "H" pulse is applied to the selector control line $7_1$ corresponding to the even-numbered horizontal interval in the order from 2nd 1H interval, 4th 1H interval, . . . , 32nd 1H interval during the fifth 1V in the same manner as the first 1V, as will be clear from the waveform of reference numeral $7_{01}$ of FIG. 5. Thereafter, the above operation is repeated in every four vertical periods to scan the photo-sensors 20 within the matrix 10. That is, all the photo-sensors 20 within the matrix 10 can be read in four vertical periods.

As will be clear from a detailed view from the photo-sensor 20 to the photo-sensor detection circuit 9 in FIG. 4, since the output of each photo-sensor 20 is connected to the photo-sensor drive TFT 21 and the integrator 4 if the selector TFT 15 is ON, it is read into the photo-sensor detection circuit 9 during the interval when the corresponding gate wiring 6 is "H" and the selector control line 7 intersecting the corresponding read signal line is "H".

Also, sign 14a of FIG. 5 denotes a discharge signal waveform with a pulse waveform in which the pulse becomes "H" for a predetermined term during horizontal blanking interval. As will be clear from FIGS. 1 and 4, the discharge signal 14 outputted from the timing controller 13 is the signal having a time length long enough to fully discharge the capacitor within the integrator 4 and to reset the photo-sensor detection circuit 9. Also, a photo-sensor detection term denoted by sign 17a in FIG. 5 is a signal that indicates "H" during a predetermined term decided by the horizontal period, the discharge signal 14a and the selector control signals $7_{01a}$ to $7_{04a}$. That is, the photo-sensor detection interval 17a is the interval where the gate electrode 6 connected to each photo-sensor 20 is "H", the selector control line 7 intersecting the read signal line 8 corresponding to the same photo-sensor is "H", and the discharge signal line 14 is "L".

FIG. 6 is a timing chart showing a drive method for the liquid crystal display with built-in photo-sensors with the above configuration and one example of the detailed waveform for the source wiring 5 disposed in the display part 10.

In FIG. 6, signs $7_{01a}$ to $7_{04a}$ ($7_{02a}$ to $7_{04a}$ are "L") are the waveforms represented by cutting out a part of the selector control signals in FIG. 5 as previously described. Similarly, signs $6_{01}$ to $6_{03}$ denote the waveforms represented by cutting out a part of the gate scanning signal. Also, signs 16a and 16b denote a part of the source drive circuit control signal 16 outputted from the timing controller 13 to the source drive circuit 1, in which sign 16a denotes a source output control signal and sign 16b denotes a polarity reversal signal. The source output control signal 16a is the pulse signal that becomes "L" if the horizontal blanking interval is ended, whereby the source drive output 5a applied from the source drive circuit 1 to the source wiring 5 is updated in synchronism with the pulse fall.

Also, the polarity reversal signal 16b is the signal for controlling the polarity of the source drive output 5a, in which if "H" is inputted into the source drive circuit 1, the source drive output becomes the first polarity (e.g., positive polarity), and if "L" is inputted into the source drive circuit 1, the source drive output becomes the second polarity (e.g., negative polarity).

Since the AC driving of two rows×one column pattern is performed as the AC drive method for liquid crystal driving in this embodiment, as previously described, the source wirings $5_{01}$ to $5_{16}$ are driven by the source drive circuit 1 in reverse polarity between adjacent source wirings (see signs + and – in FIG. 3).

The waveform of the source drive output 5a as shown in FIG. 6 represents the source drive output applied to the indefinite source wirings (e.g., $5_{01}$, $5_{03}$, $5_{05}$, ..., $5_{15}$) that are odd-numbered from the left side in FIG. 6 among the source wirings $5_{01}$ to $5_{16}$ driven by the source drive circuit 1 as shown in FIG. 2.

Also, the source drive output applied to the source wirings (e.g., $5_{02}$, $5_{04}$, $5_{06}$, ..., $5_{16}$) that are even-numbered from the left side in FIG. 6 has reverse polarity to the waveform of the source drive output 5a.

In the photo-sensor detection output 17, the discharge signal 14 becomes "L" at the end of the horizontal blanking interval so that the integrator 4 starts to read the detected output as previously described, whereby the photo-sensor detection interval is the interval as indicated by the "H" section at sign 17a.

Since the pixel sensor circuit 12 is arranged at pixels in the even-numbered rows, each pixel being AC driven in the 2 rows×one column pattern, the polarity of the source drive output 5a corresponding to the "H" section of the photo-sensor detection interval 17a is the same polarity as the source drive output 5a of the latest 1H. The peak value (maximum value: ΔVsa) from the Vcom potential that is the central potential (=counter electrode potential) of the waveform of the source drive output 5a changes in every 1H corresponding to the display image.

According to the embodiment 1, two-row reversal driving is adopted as the pixel AC drive method, in which the polarity reversal occurs in every two rows and two rows are driven in the same polarity. Further, the pixel sensor circuit is disposed in every other row. In this case, by disposing the pixel sensor circuit in the second row where the polarity does not change, the maximum change width (where all black and all white pixels are adjacent vertically) of the source drive output 5a corresponding to the "H" section of the photo-sensor detection interval 17a is ΔVsa.

When the photo-sensor reading method for reading every 1H is adopted, the change width of the source drive output 5a corresponding to the "H" section of the photo-sensor detection interval 17a is 2ΔVsa at maximum. Therefore, the change in the peak value of the source drive output 5a corresponding to the "H" section of the photo-sensor detection interval 17a can be one-half on average by employing the configuration of this embodiment 1.

That is, the pixel drive signal noise superposed on the read signal line 8 can be also one-half on average, whereby the reading of the photo-sensor can be made with low noise.

Though the pixel sensor circuit 12 of the embodiment 1 is only disposed in the B sub pixel 30b within the pixel 23, it may be disposed in another sub-pixel, or a plurality of sub pixels.

Also, though the AC drive method for liquid crystal driving is the AC driving of 2 rows×one column pattern in this embodiment, the polarities of right and left adjacent sub pixels may not necessarily different, whereby the AC drive method may be a so-called line reversal driving in which polarity reversal occurs in every two rows, or further driving in which polarity reversal occurs in rows of every multiple of 2 (2n: n is an integer of one or more). In the case of 2n row reversal driving, if the pixel sensor circuit 12 is placed within the pixels located in every predetermined row to be driven in the same polarity as the driving polarity before one row in consideration of the sensor reading positional precision required for the liquid crystal display with built-in photo-sensors, the same effect as the embodiment 1 is achieved.

That is, if each sub pixel is AC driven by the n row reversal method, and the pixel sensor circuit 12 is disposed within the sub pixel not reversed from the sub pixel immediately above during the scanning, the pixel driving signal noise superposed on the read signal line 8 can be one-half on average, whereby the reading of the photo-sensor can be practiced with low noise.

Embodiment 2

Figure 7:
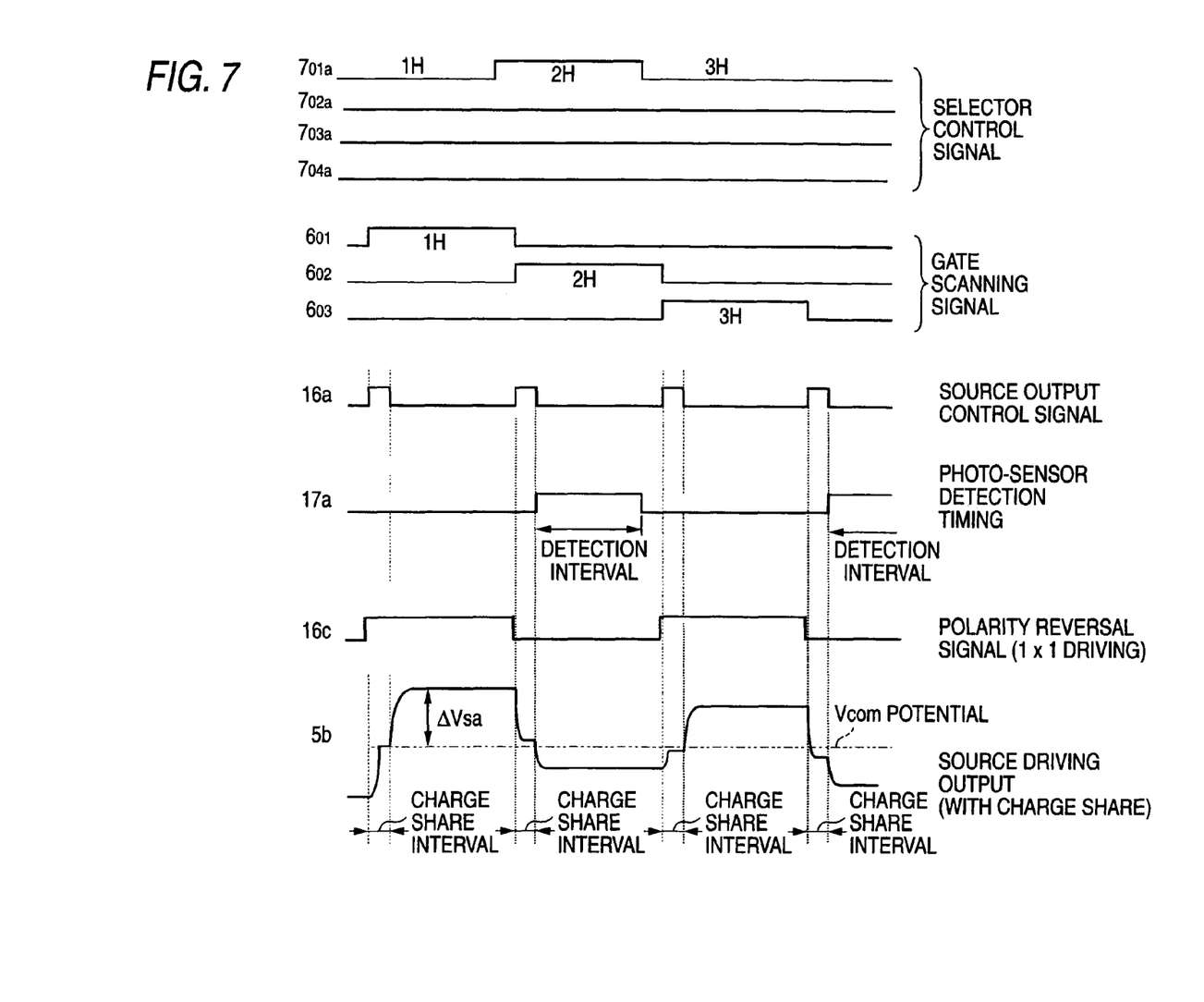
FIG. 7 is a timing chart showing a drive method for a liquid crystal display with built-in photo-sensors according to an embodiment 2 of this invention and one example of detailed waveform for the source wiring disposed in the display matrix.

FIG. 7 is a timing chart showing a drive method for a liquid crystal display with built-in photo-sensors according to an embodiment 2, and one example of the detailed waveform for the source wiring 5 disposed in the display part 10.

The liquid crystal display with built-in photo-sensors according to this embodiment, which has a feature in the source drive output applied from the source drive circuit 1 to the source wiring 5, is fundamentally the same as the embodiment 1 in the respects of the photo-sensor reading timing and the arrangement or location of pixel sensor circuits shown in FIGS. 1 to 5 of the embodiment 1, in which the detailed explanation is omitted to avoid redundancy.

In FIG. 7, sign 5b denotes a waveform example of the source drive output from the source drive circuit 1 containing a charge share function. The charge share function means the function of separating each output terminal of the source drive circuit 1 from an internal driving amplifier to short the odd-numbered output terminal and the even-numbered output terminal during the interval in which the source output control signal 16a is "H", if the polarity reversal signal 16c is changed from "H" to "L" or "L" to "H" (the polarity of the source drive output is reversed) during the interval of 1H at the rising time of the source output control signal 16a, viz., when the polarity reversal signal 16c is read into the source drive circuit 1.

In the embodiment 2, the normal dot reversal AC driving of one row×one column pattern is employed, and the odd-numbered output and the even-numbered source wiring driving output are kept in reverse polarity during the source wiring driving. Thus, if the odd-numbered output terminal and the even-numbered output terminal of the source drive circuit 1 are shorted as described above, the charges stored near the source wiring are canceled (charge shared) to keep each output terminal (i.e., source wiring) in the positive or negative polarity, so that the each source wiring has the potential near Vcom potential. This behavior is shown with the waveform of the source drive output 5b.

As will be clear from the source drive output 5b, the charge share function is performed during the interval where the source output control signal 16a is "H". Since this interval is usually during the horizontal blanking interval and the discharge signal 14 is "H", the integrator 4 is in a reset state without influence on the photo-sensor detection circuit 9.

By using the charge share function of the source drive circuit 1 when the polarity reversal of the source drive output occurs, the integrator 4 is released from the reset state, so that when the reading of the photo-sensor is started in the photo-sensor detection circuit 9, the source drive output 5b is at the potential near Vcom potential. Therefore, the change width of the source drive output 5b corresponding to the "H" section of the photo-sensor detection interval 17a is almost ΔVsa at maximum (where all black and all white pixels are adjacent vertically). In this manner, by using the charge share function contained in the source driving circuit 1 during the blanking interval, a change in the peak value of the source driving output 5b corresponding to the above section can be about one-half that in the case where the function is not used. That is, the pixel drive signal noise superposed on the read signal line 8 can be about one-half, whereby the reading of the photo-sensor 20 can be performed with low noise.

Though in the embodiment 2, the pixel sensor circuit 12 is placed in every other row in the same manner as in the embodiment 1, the reading of the photo-sensor 20 can be performed with low noise by using the charge share function, whereby it can be placed in every row, namely, all the pixels, to increase the precision of coordinate detection.

Embodiment 3

Figure 8:
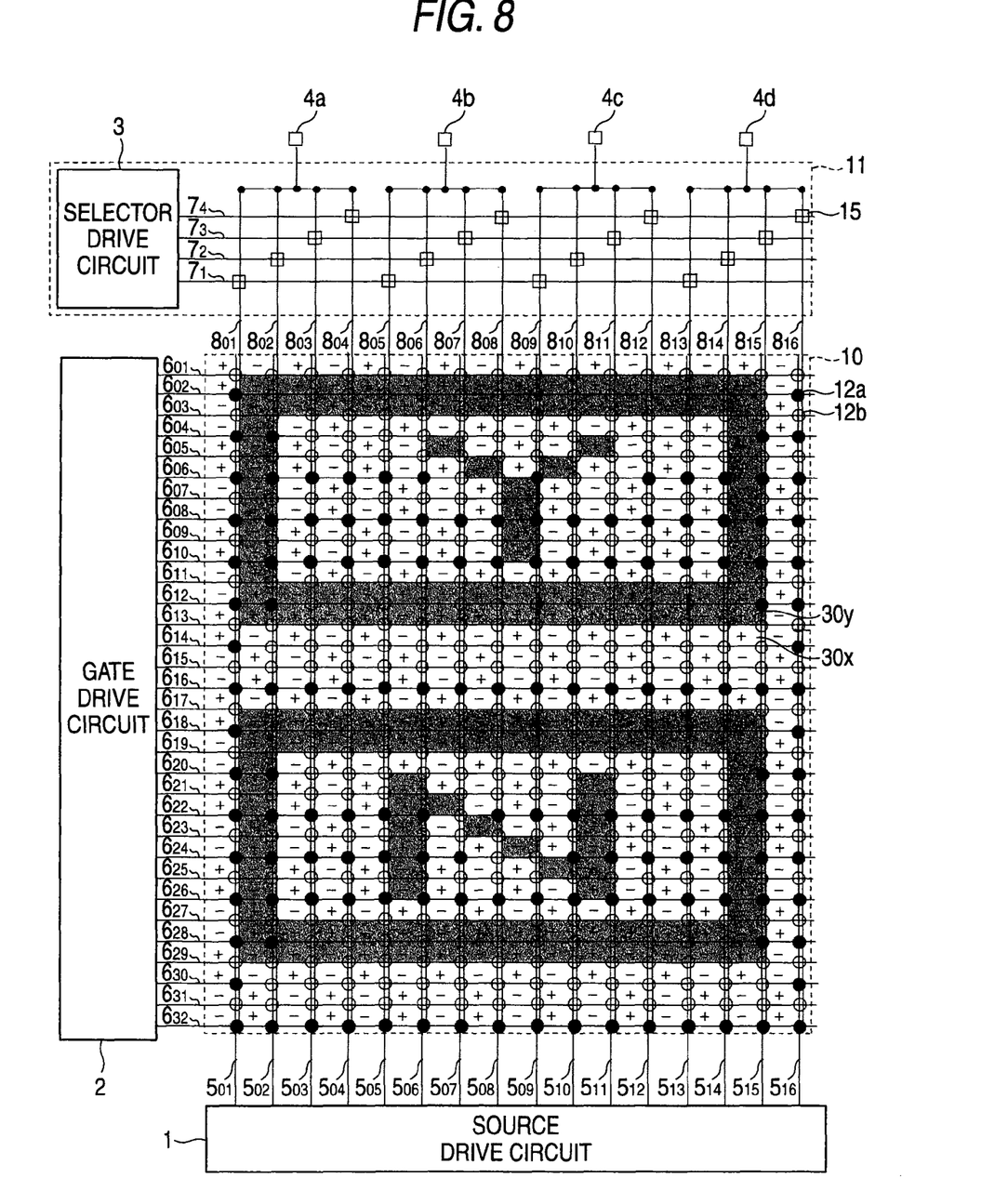
FIG. 8 is a detailed typical view showing the arrangement of a display matrix and a pixel sensor circuit according to an embodiment 3 of the invention.

FIG. 8 is a detailed typical view showing the arrangement of the display part 10 and pixel sensor circuits according to an embodiment 3. A liquid crystal display with built-in photo-sensors according to the embodiment 3, which has a feature in the arrangement of the display part 10 and pixel sensor circuits 12 and the signal processing for detection result, is fundamentally the same as the previous embodiment 1 in the respects of the basic configuration (FIG. 1), the detailed circuit (FIG. 4) from the photo-sensor 20 to the photo-sensor detection circuit 9, and the driving timing (FIGS. 5 and 6), as shown in FIGS. 1 to 6 in the embodiment 1, in which the detailed explanation is omitted to avoid redundancy.

The pixel sensor circuit of this embodiment, like the embodiment 1, includes a photo-sensor and a photo-sensor driving TFT. That is, the pixel sensor circuit 12a includes a photo-sensor 20a (first photo-sensor), not shown, and a photo-sensor driving TFT 21a (first switch element), not shown, and the pixel sensor circuit 12b includes a photo-sensor 20b (second photo-sensor), not shown and a photo-sensor driving TFT 21b (second switch element), not shown.

Referring to FIG. 8, the arrangement of the pixel sensor circuits 12a and 12b within the display part 10 will be described below. In the embodiment 3, the pixel sensor circuit 12a is disposed one at each pixel in the even-numbered row within the display part 10, and the pixel sensor circuit 12b is disposed one at each pixel in the odd-numbered row within the display part 10 (the pixel sensor circuits 12a and 12b are arranged each one in the R sub pixel, though not shown), as will be clear from the arrangement of the pixel sensor circuits represented by signs 12a and 12b of FIG. 8. Taking the pixel sensor circuits 12a and 12b as one example, the connection between the photo-sensor drive TFT and the gate wiring will be described below. The gate electrode of the photo-sensor drive TFT 21a is connected to the gate wiring $6_{02}$ and the gate electrode of the photo-sensor drive TFT 21b is connected to the gate wiring $6_{03}$. Similarly, the gate electrode of the photo-sensor drive TFT within the pixel sensor circuit arranged in the odd-numbered row is connected to the gate wiring in the odd-numbered row, and the gate electrode of the photo-sensor drive TFT within the pixel sensor circuit arranged in the even-numbered row is connected to the gate wiring in the even-numbered row.

Also, in this embodiment, the AC drive method for liquid crystal driving is the dot reversal AC driving of 2 rows×one column pattern in which the polarity of pixel in the first row and the polarity of pixel in the second row within the display part 10 are the same, as indicated by sign + and − within each sub pixel.

The signal processing for the outputs of the integrators 4a to 4d, namely, the photo-sensor detection output 17, will be described below. First of all, in the case of the dot reversal AC driving of two rows×one column pattern in which the pixels in upper two rows are driven in the same polarity as shown in FIG. 8, the pixels in the odd-numbered rows are driven in the opposite polarity to the pixels in the immediately upper row, and the output of the pixel sensor circuit disposed at the pixel is not used because the pixel driving signal noise may be superposed (represented in "○") as in the embodiment 1. The signal subjected to the signal processing in the photo-sensor signal processing circuit 42 and used for coordinate detection is the output of the pixel sensor circuit arranged within the pixel in the even-numbered row.

Herein, there are conceivably two methods for making the signal processing as the output of the pixel sensor circuit in the even-numbered row. A first method is the same as in the embodiment 1, that is, the selector control signals $7_{01}$ to $7_{04}$ as the outputs of the selector driving circuit 3 and the discharge signal 14a are a pulse train having an interval length of 1H which becomes "H" at every other 1H, and the output of the pixel sensor circuit 12b in the odd-numbered row is cut off by the selector TFT 15.

A second method is that the read scanning of the photo-sensor 20 is firstly performed for all the photo-sensors 20 within the display part 10, and all the photo-sensor detection results are accumulated in the memory (not shown) within the photo-sensor signal processing circuit 42. Then, at a signal processing step for making the coordinate detection in the photo-sensor signal processing circuit 42, the coordinate detection is made only with the detection result of the pixel sensor circuit 12a corresponding to the even-numbered row. The detection result of the pixel sensor circuit 12b located in the odd-numbered row is not used.

In this case, the selector control signals $7_{01}$ to $7_{04}$ and the discharge signal 14a are not the pulse train in which the pulse becomes "H" at every other 1H, but becomes "1H" at every 1H (not shown).

Moreover, in this embodiment 3, in addition to the signal processing with only the detection result of the pixel sensor circuit 12a corresponding to the even-numbered row, if a difference between the display gradation value of the sub pixel (e.g., sub pixel 30x) used for the signal processing and the display gradation value of sub pixel (e.g., sub pixel 30y) one pixel above that is not used for the signal processing is a predetermined value or more, the detection result of the pixel sensor circuit 12a is not used at the signal processing step.

As one example, the character Y and the character N, which are surrounded by rectangle, are displayed on the display part 10, and a light shielding object such as a finger touches near the character Y or character N, whereby the selective input of Yes or No is artificially made based on the detection result of the photo-sensor 20, as shown in FIG. 8.

As regards the pixel 30x (pixel connected to the gate wiring $6_{14}$ and the source wiring $5_{15}$) and the pixel 30y (pixel connected to the gate wiring $6_{13}$ and the source wiring $5_{15}$) as shown in FIG. 8, the pixel 30x is a background part and the pixel 30y is a part of the rectangular display, in which a difference in the gradation value between both the pixels is the predetermined value or more. Therefore, it is judged that the detection result of the pixel 30x is not used.

The above judgment as to whether the detection result is used or not is performed for the detection results of the pixel sensor circuits 12a located at all the pixels in the even-numbered rows within the display part 10. In the case of a display example as shown in FIG. 8, it is judged that the pixel sensor circuit 12a as indicated by "●" is usable at the signal processing step. The pixel sensor circuit 12a judged as not used is indicated by "○". Further, since all the pixel sensor circuits 12b are not used as described above, they are indicated by "○".

A threshold of the gradation difference from the pixel immediately above as the reference for judging whether or not the detection result of the specific pixel sensor circuit 12a is usable is decided in consideration of the amount of superposition of the pixel drive signal noise and the display screen of the display part 10 at the time of actual production. For example, in the case where the selective input of Yes/No is made artificially, the displayed image has a relatively large area of solid screen (screen with uniform gradation) because the complicate display is unnecessary. The number of sensors with "○" is small even if the threshold of the gradation different is 0 ("●" only if there is no gradation change), in which the precision problem does not occur in the coordinate detection process.

Embodiment 4

Figure 9:
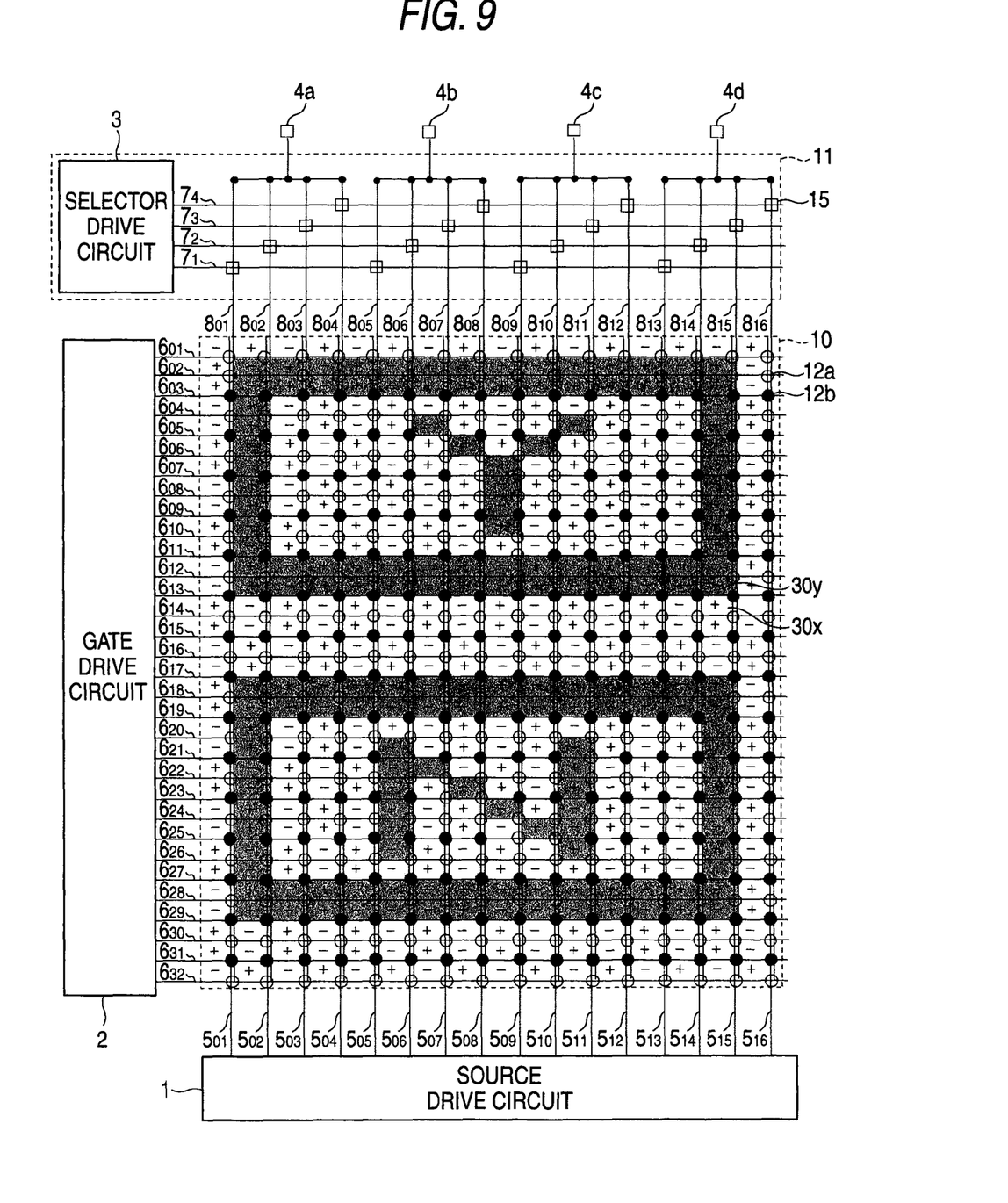
FIG. 9 is a detailed typical view showing the arrangement of a display matrix and a pixel sensor circuit according to an embodiment 4 of the invention.

FIG. 9 is a detailed typical view showing the arrangement of the display part 10 and pixel sensor circuits according to an embodiment 4. A liquid crystal display with built-in photo-sensors according to the embodiment 4, which has a feature in the pixel AC drive method for the display part 10 and the signal processing for detection result, is fundamentally the same as the previous embodiment 1 in the respects of the basic configuration (FIG. 1), the detailed circuit (FIG. 4) from the photo-sensor 20 to the photo-sensor detection circuit 9, and the driving timing (FIGS. 5 and 6), as shown in FIGS. 1 to 6 for the embodiment 1, and is the same in the main part of the detailed typical view showing the arrangement of the display part 10 and pixel sensor circuits 12 as the previous embodiment, in which the detailed explanation is omitted to avoid redundancy.

Though in the embodiments 1 to 3, the dot reversal AC driving of 2 rows×one column pattern in which the polarity of pixel in the first row and the polarity of pixel in the second row within the display part 10 are the same is performed, the AC driving of two rows×one column pattern in which the polarity of pixel in the first row and the polarity of pixel in the second row are different is performed in the embodiment 4 as shown in FIG. 9.

The AC drive method of the embodiment 4 as shown in FIG. 9 has the alternating pattern of two rows×one column shifted by one row from the previous embodiment 3. That is, the dot reversal AC driving pattern, shifted one row above, except for the first row and the last row of the display part 10, is the same as in the embodiment 3. On the contrary, since the image displayed on the display part 10 is the same, if judgment whether or not the detection result of each pixel sensor circuit 12 is used is made with the same reference as in the embodiment 3, the results are indicated by "●" and "○" (the meaning of "●" and "○" is the same as in the embodiment 3) as shown in FIG. 9, and different from the embodiment 3.

That is, the position of the photo-sensor 20 made usable can be changed only by shifting the alternating pattern of two rows×one column by one row. That is, shifting the alternating pattern by one row is relatively equivalent to shifting the display image by one row from the embodiment 3.

This means that more detection results of each pixel sensor circuit 12 can be used by combining the dot reversal AC driving of two rows×one column pattern (first AC driving pattern) in which the polarity of pixel in the first row and the polarity of pixel in the second row within the display part 10 are the same as shown in the embodiment 3 and the AC driving of two rows×one column pattern (second AC driving pattern) in which the polarity of pixel in the first row and the polarity of pixel in the second row are different as shown in this embodiment.

Moreover, if a pair of longitudinal two pixels within the display part 10 are considered in this embodiment, the pixels (first pixel electrodes) located in the even-numbered row are driven in the even-numbered horizontal period (first scanning period) after the end of vertical blanking, and therefore always driven in the same polarity as the pixels (second pixel electrodes) located in the odd-numbered row immediately under the even-numbered row (except for the last row), which are driven in the subsequent odd-numbered horizontal period (second scanning period). Also, the upper pixel (first pixel electrode) is located in the even-numbered row, and the lower pixel (second pixel electrode) is located in the odd-numbered row. Herein, the pixel sensor circuit 12 is disposed in every row as shown in FIG. 9, in which the detection result of the pixel sensor circuit 12a disposed at the pixel located in the even-numbered row is not used because the pixel is driven in the reverse polarity to the pixel in the immediately upper row (as represented by "○"). Accordingly, the pixel where the pixel sensor circuit 12b using the detection result (as represented by "●") is disposed is always driven in the same polarity as the pixel in the immediately upper row in the same manner as in the embodiment 3.

Embodiment 5

Figure 10:
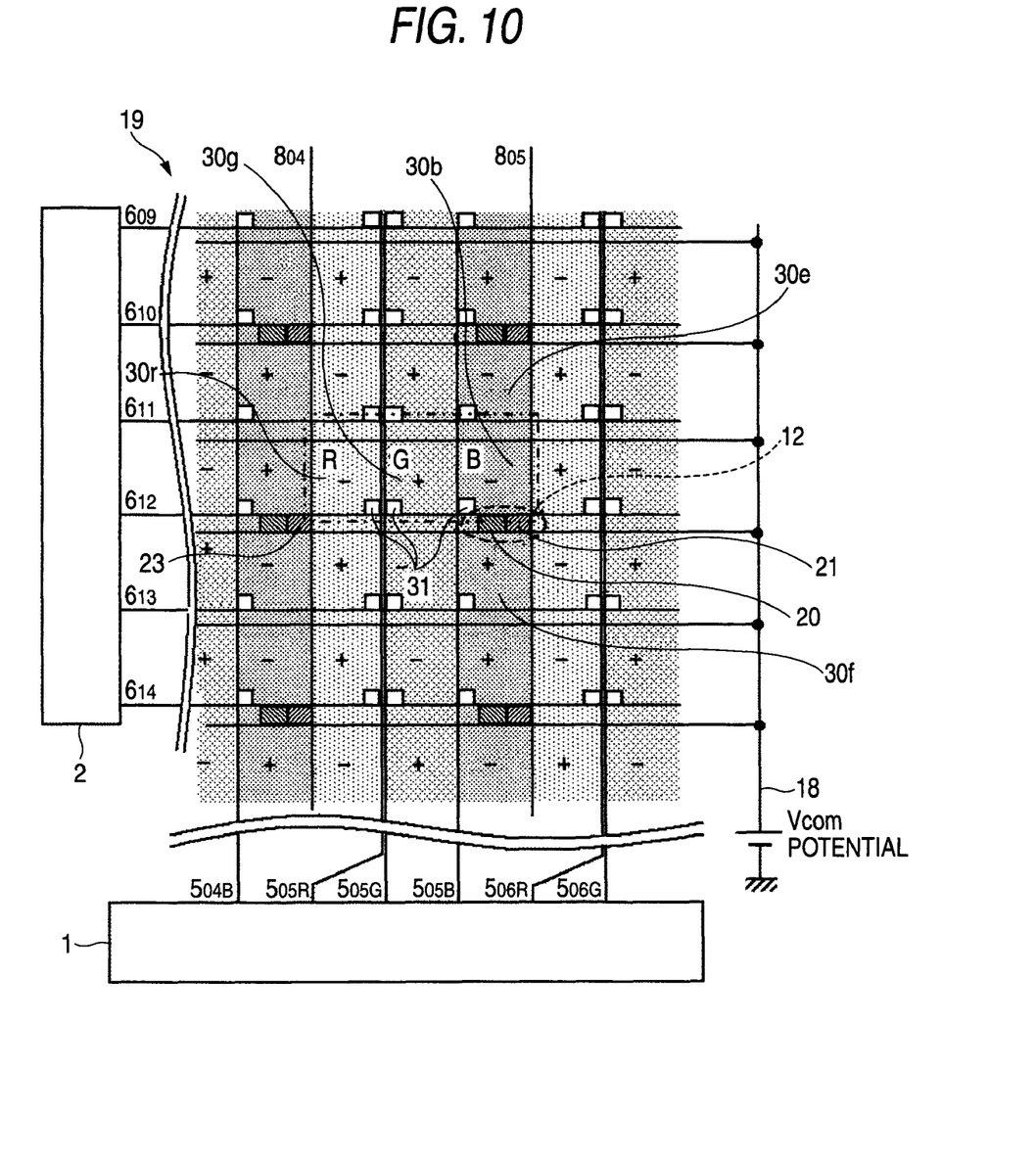
FIG. 10 is a detailed configuration view of a matrix display circuit in a part of the display matrix according to an embodiment 5 of the invention.

FIG. 10 is a detailed configuration view showing a matrix display part 19 in a part of the display part 10. A liquid crystal display with built-in photo-sensors according to an embodiment 5, which has a feature in the matrix display circuit 19 in a part of the display part 10, is the same as the previously-described embodiment 1 in the respects of the basic configuration (FIG. 1) the detailed circuit (FIG. 4) from the photo-sensor 20 to the photo-sensor detection circuit 9, and the driving timing (FIGS. 5 and 6), as shown in FIGS. 1 to 6 of the embodiment 1, except for FIG. 3, in which the detailed explanation is omitted to avoid redundancy.

The configuration of the pixel sensor circuit 12 within the pixel will be described below in detail, employing one pixel 23 as shown in FIG. 10. The pixel 23 includes a sub pixel 30r displaying red color, a sub pixel 30g displaying green color and a sub pixel 30b displaying blue color, and the pixel drive TFT 31 is disposed at lower left or lower right corner of each sub pixel. The source electrode of each pixel drive TFT 31 for driving each sub pixel is connected to the source electrodes $5_{05R}$, $5_{05G}$ and $5_{05B}$, and the gate electrode is connected to the common gate electrode $6_{12}$. Also, a common electrode wiring 18 for feeding an auxiliary capacity electrode, not shown, extends in the row direction in the central upper part of each sub pixel, and is supplied with a Vcom potential that is the potential of a counter electrode, not shown.

Herein, the pixel sensor circuit 12 is disposed one at each pixel in the odd-numbered row. For example, at one pixel 23, the pixel sensor circuit is disposed at the upper part (particularly an area surrounded by the gate wiring $6_{12}$ and the common electrode wiring 18) of the sub pixel 30f in the row immediately under the B sub pixel 30b, and includes a photo-sensor 20 and a photo-sensor drive TFT 21. The photo-sensor 20 has one end connected to the source electrode of the photo-sensor drive TFT 21, and the other end connected to the common electrode wiring 18, as previously described. The photo-sensor drive TFT 21 further has the drain electrode connected to the signal line $8_{05}$, and the gate electrode connected to the gate wiring $6_{12}$.

As illustrated above, the gate electrode of the photo-sensor drive TFT 21 for driving the photo-sensor 20, unlike the gate wiring $6_{13}$ for scanning the pixel 30f where the pixel sensor circuit 12 is disposed, is connected to the gate wiring $6_{12}$ in the even-numbered row immediately above.

Further, in this embodiment, as an AC drive method for liquid crystal driving, a dot reversal AC driving of two rows× one column pattern in which the polarity in the top row of the display part 10 and the polarity in the second row are the same is performed, as indicated by the sign + and − within each sub pixel in FIG. 10.

For example, a sub pixel 30e driven by the gate wiring $6_{11}$ is driven in negative polarity in the eleventh horizontal period after the end of vertical blanking, and a sub pixel 30b driven by the gate wiring $6_{12}$ is driven in negative polarity in the twelfth horizontal period after the end of vertical blanking. Also, the sub pixels right and left adjacent to the sub pixels 30e and 30b are driven in positive polarity in the same horizontal period.

That is, the sub pixels adjacent in every column (transverse direction) have a drive pattern different in + and −, and the sub pixels adjacent in every row (longitudinal direction) have a drive pattern alternating in + and − in every two rows. Accordingly, when a pair of longitudinally two sub pixels within the display part 10 is considered, the sub pixel (first pixel electrode) located in the odd-numbered row is driven in the odd-numbered horizontal period (first scanning period) after the end of vertical blanking, and always driven in the same polarity as the sub pixel (second pixel electrode) located in the even-numbered row which is subsequently driven in the even-numbered horizontal period (second scanning period). Also, the upper pixel is located in the odd-numbered row, and the lower pixel is located in the even-numbered row. Also, if the pixel sensor circuit 12 is disposed in every other row, as shown in FIG. 10, and the pixel sensor circuit 12 is disposed at the sub pixel in the odd-numbered row as described above. Also, since the photo-sensor drive TFT 21 of the pixel sensor circuit 12 has the gate electrode connected to the gate wiring for driving the pixels in the even-numbered row as shown in FIG. 10, the output of the pixel sensor circuit 12 is applied to the read signal line 8, corresponding to the even-numbered horizontal period after the end of vertical blanking, and inputted via the selector circuit 11 into the photo-sensor detection circuit 9.

Generally, the polarity of positive or negative in each sub pixel of two rows×one column pattern is reversed for every frame, as well known. It is analogous in this embodiment, and not described in detail here.

In FIG. 10, the source wirings $5_{05R}$ and $5_{06R}$ for driving the R sub pixel are wired on the right side of the corresponding sub pixel, as in FIG. 3.

As described above, the pixel sensor circuit 12 is disposed at the sub pixel in the odd-numbered row, but the gate electrode of the photo-sensor drive TFT 21 is connected to the gate electrode in the even-numbered row immediately above.

Accordingly, a drive signal of the drive TFT 21 in the pixel sensor circuit 12 can directly use the timing as described in FIG. 5, and is not specifically required to change.

The pixel sensor circuit 12 can be disposed in the greater distance from the pixel TFT 31. Also, the pixel sensor circuit 12 can be sandwiched and sealed between the gate wiring 6 without voltage variation and the common electrode wiring 18 at least during the detection interval, there reducing the coupling noise.

The circuit configuration of the selector circuit 11 as shown in FIG. 2 in the previous embodiments 1 to 5, namely, the time division multiplexing reading method for the read signal line 8 may be made in various time division multiplexing methods as well known, besides the four time division multiplexing in which four lines are unified as described in the embodiment 1.

Further, though the method for reading the output of the pixel sensor circuit 12 within the display part 10 in 1V in the pixel direction from top to bottom in one column has been exemplified, as shown in FIG. 5, other known methods, such as shifting the read photo-sensor 20 in the lower left or lower right direction may be employed. For example, such method can be easily implemented by changing the timing of the selector control signals as indicated by reference numerals $7_{01}$ to $7_{04}$.

Also, the drive method for the pixel sensor circuit in the embodiments 1 to 5 may be performed singly, or in combination, to achieve the same effect.

Further, the photo-sensor detection circuit having the drive method of the embodiments 1 to 5 and the select drive circuit and the gate drive circuit are integrated into the existent display device circuit board, whereby it is possible to reduce the circuit scale, recognize the display pattern more simply, identify the ON/OFF of the photo-sensor, and detect the input coordinate.

By the way, in the embodiments 1 to 5, the time division multiplexing method is adopted using the selector circuit including the selector control line, the selector TFT and the selector drive circuit, but it is not requisite that the selector circuit is used in the liquid crystal display containing the photo-sensor, and even if the read signal line and the integrator are directly connected, it is possible to achieve the object of reducing the influence of the coupling noise on the read signal line due to polarity reversal of the source wiring potential of the invention.

Also, the timings of the selector control signal, the gate wiring drive signal, the discharge signal and the source wiring output signal as shown in the embodiments 1 to 5 are only illustrative for explaining the invention, but may be appropriately changed in realizing the actual image display device.

Further, though the image display device as shown in the embodiments 1 to 5 has been described above using the liquid crystal display with built-in photo-sensors, the display device is not necessarily a liquid crystal panel, but may be any other display device such as an organic EL display device as far as the display device displays the image by sequentially scanning the display screen. In the display device using an emissive device such as an organic EL element, it is required that the pixel sensor circuit containing the photo-sensor is fully shielded against light from the emissive device.

What is claimed is:

1. An image display device comprising:
   a source wiring formed within a display screen;
   a first gate wiring that is formed within the display screen and intersects the source wiring to scan a first pixel electrode corresponding to a first scanning period;
   a second gate wiring that is formed adjacent to the first gate wiring to scan a second pixel electrode corresponding to a second scanning period consecutive to the first scanning period;

a read signal line disposed in parallel to the source wiring;
a light sensing element connected to the second gate wiring and the read signal line;
a light detection circuit configured to detect the presence or absence of light directed at the light sensing element upon receiving an output of the light sensing element,
wherein the first pixel electrode and the second pixel electrode are AC driven in the same polarity,
the output of the light sensing element is connected via the read signal line to the light detection circuit for a predetermined interval during the second scanning period, and
light sensing elements are disposed only in every other row as defined by the first and second gate wiring;
a light detection signal processing circuit that is connected with the light detection circuit to detect an input coordinate based on the output of the light detection circuit,
wherein, when a difference between a gradation value displayed at the first pixel electrode and a gradation value displayed at the second pixel electrode is a predetermined value or more, the output of the light sensing element is not used for detecting the input coordinate.

2. The image display device according to claim 1, further comprising a common wiring that intersects the source wiring,
wherein the light sensing element is disposed between the common wiring and the second gate wiring.

3. The image display device according to claim 1, further comprising a selector circuit disposed between the read signal line and the light detection circuit,
wherein the output of the light sensing element is connected to the light detection circuit for the predetermined interval by the selector circuit.

4. The image display device according to claim 1, further comprising a source wiring drive circuit that drives the source wiring,
wherein, when a polarity reversal of the AC drive occurs in the source wiring drive circuit, the source wiring drive circuit once outputs a near intermediate potential to the source wiring to reverse-polarity drive the pixel electrode.

5. The image display device according to claim 4, wherein the near intermediate potential is outputted using a charge share function provided for the source wiring drive circuit.

6. An image display device comprising:
a source wiring formed within a display screen;
a first gate wiring that is formed within the display screen and intersects the source wiring to scan a first pixel electrode corresponding to a first scanning period;
a second gate wiring that is formed adjacent to the first gate wiring to scan a second pixel electrode corresponding to a second scanning period consecutive to the first scanning period;
a read signal line disposed in parallel to the source wiring;
a light sensing element connected to the second gate wiring and the read signal line;
a light detection circuit configured to detect the presence or absence of light directed at the light sensing element upon receiving an output of the light sensing element,
wherein the first pixel electrode and the second pixel electrode are AC driven in the same polarity,
the output of the light sensing element is connected via the read signal line to the light detection circuit for a predetermined interval during the second scanning period, and
light sensing elements are disposed only in every other row as defined by the first and second gate wiring;
a light detection signal processing circuit that is connected with the light detection circuit to detect an input coordinate based on the output of the light detection circuit,
wherein, only when a gradation value displayed at the first pixel electrode is the same as a gradation value displayed at the second pixel electrode, the output of the light sensing element is used for detecting the input coordinate.

7. An image display device comprising:
a source wiring formed within a display screen;
a first gate wiring that is formed within the display screen and intersects the source wiring to scan a first pixel electrode corresponding to a first scanning period;
a second gate wiring that is formed adjacent to the first gate wiring to scan a second pixel electrode corresponding to a second scanning period consecutive to the first scanning period;
a read signal line disposed in parallel to the source wiring;
a light sensing element connected to the second gate wiring and the read signal line;
a light detection circuit configured to detect the presence or absence of light directed at the light sensing element upon receiving an output of the light sensing element,;
a light detection signal processing circuit that is connected with the light detection circuit to detect an input coordinate based on the output of the light detection circuit,
wherein the first pixel electrode and the second pixel electrode are AC driven in the same polarity,
the output of the light sensing element is connected via the read signal line to the light detection circuit for a predetermined interval during the second scanning period, and
when a difference between a gradation value displayed at the first pixel electrode and a gradation value displayed at the second pixel electrode is a predetermined value or more, the output of the light sensing element is not used for detecting the input coordinate.

8. An image display device comprising:
a source wiring formed within a display screen;
a first gate wiring that is formed within the display screen and intersects the source wiring to scan a first pixel electrode corresponding to a first scanning period;
a second gate wiring that is formed adjacent to the first gate wiring to scan a second pixel electrode corresponding to a second scanning period consecutive to the first scanning period;
a read signal line disposed in parallel to the source wiring;
a light sensing element connected to the second gate wiring and the read signal line;
a light detection circuit configured to detect the presence or absence of light directed at the light sensing element upon receiving an output of the light sensing element,;
a light detection signal processing circuit that is connected with the light detection circuit to detect an input coordinate based on the output of the light detection circuit,
wherein the first pixel electrode and the second pixel electrode are AC driven in the same polarity,
the output of the light sensing element is connected via the read signal line to the light detection circuit for a predetermined interval during the second scanning period, and
only when a gradation value displayed at the first pixel electrode is the same as a gradation value displayed at the second pixel electrode, the output of the light sensing element is used for detecting the input coordinate.

* * * * *